Patented Mar. 18, 1952

2,589,750

UNITED STATES PATENT OFFICE 2,589,750

REVIVIFYING SPENT ACTIVATED CARBON BY A PROCESS EMPLOYING A DOUBLE SODIUM BICARBONATE WASH

Herman Leendert Van Nouhuys, Breda, Netherlands, assignor to American Enka Corporation, Enka, N. C., a corporation of Delaware No Drawing. Application April 9, 1948, Serial No. 20,104. In the Netherlands October 6, 1947

2 Claims. (Cl. 252—412)

The present invention relates to a process for restoring the adsorption capacity of activated carbon, and more particularly it relates to purifying activated carbon that has become contaminated with impurities of sulphuric acid and sulphur as a result of utilizing the activated carbon to adsorb disulphide from exhaust gases in a viscose rayon manufacturing plant.

It is well known that in the manufacture of artificial threads according to the viscose process a substantial portion of the carbon disulphide used in the process can be recovered. The greater part of the recoverable carbon disulphide in the air is removed from the spining and washing department. Another part is present in the waste water from which it can be separated by aeration. The air and carbon disulphide mixture can then be supplied to the recovery plant.

In order to recover the carbon disulphide, the carbon disulphide-containing gases are passed through activated carbon. In this way the carbon disulphide is adsorbed and removed by means of a steam treatment and thereafter recovered in concentrated form.

It is known that the adsorption capacity of carbon for carbon disulphide decreases when it has been in continuous use for long periods of time. This is due to the fact that sulphuric acid is formed in the adsorbent. The original adsorption capacity of the carbon can be restored to some extent by occasional washing from time to time. For this purpose the adsorbent has either been leached by means of water or it has been treated with alkaline solutions and then washed with water. Of course, in both cases it was necessary to dry the adsorbent, e. g., by means of hot air and to thereafter cool the activated carbon in any suitable way (Dutch Patent No. 59,510), before it could be again employed for the adsorption of carbon disulphide.

The presence of the sulphuric acid in the activated carbon reduces the adsorption power thereof, and the sulphuric acid content increases for two reasons. First, even though the carbon disulphide-containing gases of the viscose rayon industry are subjected to a technical purification, usually some hydrogen sulphide is contained therein which is adsorbed by the activated carbon. This hydrogen sulphide, during the evaporation of the carbon disulphide and drying of the carbon, is oxidized to sulphuric acid by the oxygen in the atmosphere and remains in the activated carbon. Second, during the evaporation and drying, a small portion of the carbon disulphide per se also effects the formation of sulfuric acid.

According to extensive investigations, it is believed that the slow conversion of carbon disulphide into sulphuric acid during evaporation and drying of the activated carbon can be expressed by the following equations:

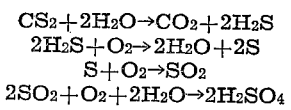

$$CS_2 + 2H_2O \rightarrow CO_2 + 2H_2S$$
$$2H_2S + O_2 \rightarrow 2H_2O + 2S$$
$$S + O_2 \rightarrow SO_2$$
$$2SO_2 + O_2 + 2H_2O \rightarrow 2H_2SO_4$$

Therefore, the formation of sulphuric acid as a result of the two causes mentioned above is based on the oxidation of hydrogen sulphide during steaming and drying. It was learned that the sulphur which is formed from the adsorbed hydrogen sulphide continues oxidizing very slowly, so that an appreciable part of it is accumulated in the activated carbon. As a result of this the activated carbon which is used for the adsorption of carbon disulphide always contains a certain percentage of free sulphur in addition to the sulphuric acid.

Experiments have led to the discovery that by means of repeated washings with cold or hot water, the sulphuric acid content of the activated carbon, which under certain conditions can increase to 10% or even more, cannot be reduced to less than 3% of the weight of the activated carbon. Thus it is obvious that the acid in the activated carbon is present in two different forms, i. e., part of the sulphuric acid, viz. up to about 3%, is combined rather strongly with the activated carbon by means of secondary valences (combined sulphuric acid). As a consequence of this the combined sulphuric acid cannot be washed out with water in the usual sense of the word. The remaining part, i. e., 3% to 10% or more is either combined in a loose state, or it is not combined at all (free sulphuric acid) and can be removed very easily by means of water. From this it follows that the well known washing with water can never completely restore the adsorption capacity of activated carbon.

When the activated carbon after having been used for a considerable period and having accumulated a considerable quantity of sulphuric acid, is either treated with a dilute alkaline solution or is first washed out with water and treated with an alkaline solution, and then in both cases is washed with water to remove the remainder of the alkali, it is possible to remove the residual sulphuric acid before drying. The carbonates of the solid alkali-metals have been found to be very suitable for the removal of the sulphuric acid. However, in view of the fact that these carbonates might attack parts of the apparatus consisting of aluminum, etc., it was determined that sodium bicarbonate (NaHCO₃) is normally preferred. Additionally, it was determined that when neutral unused or fresh activated carbon is soaked, e. g., with a 10% sodium bicarbonate solution for 15 hours at an elevated temperature, the excess solution is removed and without washing, dried with the residual adhering solution at, e. g., 110° C., the activated carbon contains about 15% of sodium carbonate. It was unexpectedly determined that due to the presence of this sodium carbonate, the adsorption capacity of the activated carbon for carbon disulphide did not decrease noticeably.

However, when an activated carbon which has already been used for the adsorption of carbon disulphide and which consequently contains sulphuric acid, is soaked with a sodium bicarbonate solution, an unexpected result is obtained after drying at temperatures and for periods which are customary for the drying of adsorbents. It was determined that no sodium bicarbonate or no sodium carbonate was present in the activated carbon. Further investigations showed that this disappearance of the sodium carbonate was ascribed to the presence of a certain amount of sulphur in the activated carbon. It was ascertained that the free sulphur which is present in the adsorbent is oxidized to sulphuric acid during the steam treatment and drying of the adsorbent. Normally, this oxidation takes place very slowly. Due to the presence of alkaline substances (sodium bicarbonate or sodium carbonate), this process is appreciably accelerated as the alkali immediately combines with the sulphuric acid formed. The formation of sodium sulphate results in the disappearance of a corresponding quantity of alkali.

Therefore, this novel process for restoring the adsorption capacity of activated carbon is characterized by the fact that the activated carbon, which is contaminated by sulphuric acid and free sulphur, is treated with weakly alkaline substances, either with or without a preliminary washing of water, whereafter the excess liquid is removed. The treated activated carbon is not washed but, together with the residual adhering liquid, is subjected to a known drying process. As weakly alkaline solutions, the solutions of alkali metal salts that have an alkaline reaction or are capable of combining with acid, can be used, although sodium bicarbonate is preferred.

The great advantage of this process is that it is possible to remove by means of a single chemical, not only the sulphuric acid completely, but also a great part, or even all, of the free sulphur from the adsorbent material. The decrease or even the total disappearance of sulphur in the adsorbent has the further special effect or advantage that the increase of the concentration of the sulphuric acid which is formed at an intermediate state by means of the free sulphur, is appreciably decreased during the succeeding periods in which the carbon is used.

Moreover, it was found that the process can be improved considerably if, before drying, and after the sulphuric acid present has been washed out with, e. g., a 4% to 5% sodium bicarbonate solution, the activated carbon is subjected to treatment with an alkaline solution having a higher concentration than the alkaline solution first employed. This can be effected in any suitable way such as by aftertreating the adsorbent which has already been treated with a 4% to 5% sodium bicarbonate solution, with an alkaline solution of a concentration, e. g., of 6% to 10% sodium bicarbonate, which displaces the first alkaline solution. After this, the excess liquid is discharged, and the activated carbon is dried, together with the adhering liquid of higher alkalicontent. In this respect, it is immaterial whether the sulphuric acid is washed out by means of a liquid with a lower or higher alkali concentration. It is only important that during the drying of the adsorbent a higher percentage of an alkali-carbonate is present in the adsorbent.

It was determined that when a 5% sodium bicarbonate solution was used, the sulphur content of the activated carbon was reduced by about 2%; when a 9.5% solution was employed, the sulphur content was reduced by at least 3%. As a matter of fact, the effect is not only dependent on the alkali concentration of the solution which is still present before drying, but also on the quantity of the solution adhering per unit of weight of activated carbon. This quantity of liquid can vary within small ranges depending on the shape and type of activated carbon employed.

This invention makes it possible to maintain the sulphur content in the adsorbent at a relatively low level, and to keep it constant at a very low level at the initiation of each new period of use. Consequently the time interval between each two succeeding restoring operations is materially lengthened.

It is to be understood that this process is not restricted to restoring the adsorption capacity of activated carbon used in the adsorption of carbon disulphide from the exhaust gases of a viscose rayon manufacturing plant, as this same principle can be utilized in all operations where activated carbon which contains impurities of sulphuric acid and sulphur must be regenerated, i. e., where the original adsorption capacity must be restored. An extensive field of application of this process is made possible because the remaining impurity in the activated carbon after restoration consists of only a small quantity of neutral sodium sulphate. The adsorption capacity is not influenced by this salt because it is washed out after every periodic wet treatment of the activated carbon.

What is claimed is:

1. A process for revivifying activated carbon that has been rendered inert by contamination by sulphur-containing waste gases and oxidation products thereof incident to the manufacture of viscose rayon, which comprises treating the contaminated carbon with a dilute aqueous solution of sodium bicarbonate and immediately thereafter treating the carbon with a second dilute aqueous solution of sodium bicarbonate that is more concentrated than the first solution, removing the excess liquid from the carbon and drying the carbon at about 110° C. in situ, in the presence of residual sodium bicarbonate, whereby the incompletely oxidized sulphur-containing compounds are completely oxidized and combined with sodium bicarbonate to form sodium sulphate.

2. A process for revivifying activated carbon that has been rendered inert by contamination by sulphur-containing waste gases and oxidation products thereof incident to the manufacture of viscose rayon, which comprises first treating the contaminated carbon with an aqueous solution containing 4–5% sodium bicarbonate and then treating the carbon with an aqueous solution containing 6–10% sodium bicarbonate, removing the excess liquid from the carbon and drying the carbon at about 110° C. in situ, in the presence of residual sodium bicarbonate, whereby the incompletely oxidized sulphur-containing compounds are completely oxidized and combined with sodium bicarbonate to form sodium sulphate.

HERMAN LEENDERT VAN NOUHUYS.

REFERENCES CITED

The following references are of record in the file of this patent:

UNITED STATES PATENTS

| Number | Name | Date |
|---|---|---|
| 1,189,896 | Wijnberg | July 4, 1916 |
| 1,711,449 | Cunningham | Apr. 30, 1929 |
| 2,067,985 | Sargent | Jan. 19, 1937 |
| 2,172,025 | Langwell et al. | Sept. 5, 1939 |
| 2,455,260 | Meerdink | Nov. 30, 1948 |

FOREIGN PATENTS

| Number | Country | Date |
|---|---|---|
| 11,860 | Great Britain | 1912 |
| 472,958 | Germany | Mar. 3, 1928 |